United States Patent [19]
Mercer, Jr.

[11] 3,899,922
[45] Aug. 19, 1975

[54] DOUBLE LEVER STRAIN MULTIPLIER APPARATUS AND METHOD

[75] Inventor: Nelson M. Mercer, Jr., Detroit, Mich.

[73] Assignee: Ford Motor Company, Dearborn, Mich.

[22] Filed: Dec. 5, 1973

[21] Appl. No.: 422,111

[52] U.S. Cl. ............................................ 73/88.5 R
[51] Int. Cl.² ........................................... G01B 7/16
[58] Field of Search... 73/88.5 R, 92, 141 A, 432 A; 33/147 D, 148 D

[56] References Cited
UNITED STATES PATENTS

| | | | |
|---|---|---|---|
| 2,666,262 | 1/1954 | Ruge | 33/148 D |
| 2,729,973 | 1/1956 | Strimel | 73/141 A |
| 2,998,584 | 8/1961 | Statham | 73/141 A X |
| 3,248,936 | 5/1966 | Lee et al. | 73/141 A |

FOREIGN PATENTS OR APPLICATIONS
579,206  7/1946  United Kingdom............... 33/147 D Primary Examiner—Charles A. Ruehl
Attorney, Agent, or Firm—Robert A. Benziger; Keith L. Zerschling

[57] ABSTRACT

A strain multiplier having a pair of pivotally interconnected lever arm members and its method of strain multiplication is disclosed. The free ends of the lever arm members are pivotally connected to a structural member subjected to strains. A plurality of strain gauge members are connected between the structural member and the strain multiplier with the points of connection between the strain gauge members and the arms of the strain multiplier at different distances along the strain multiplier from the points of connection between the strain multiplier and the structural member.

7 Claims, 2 Drawing Figures

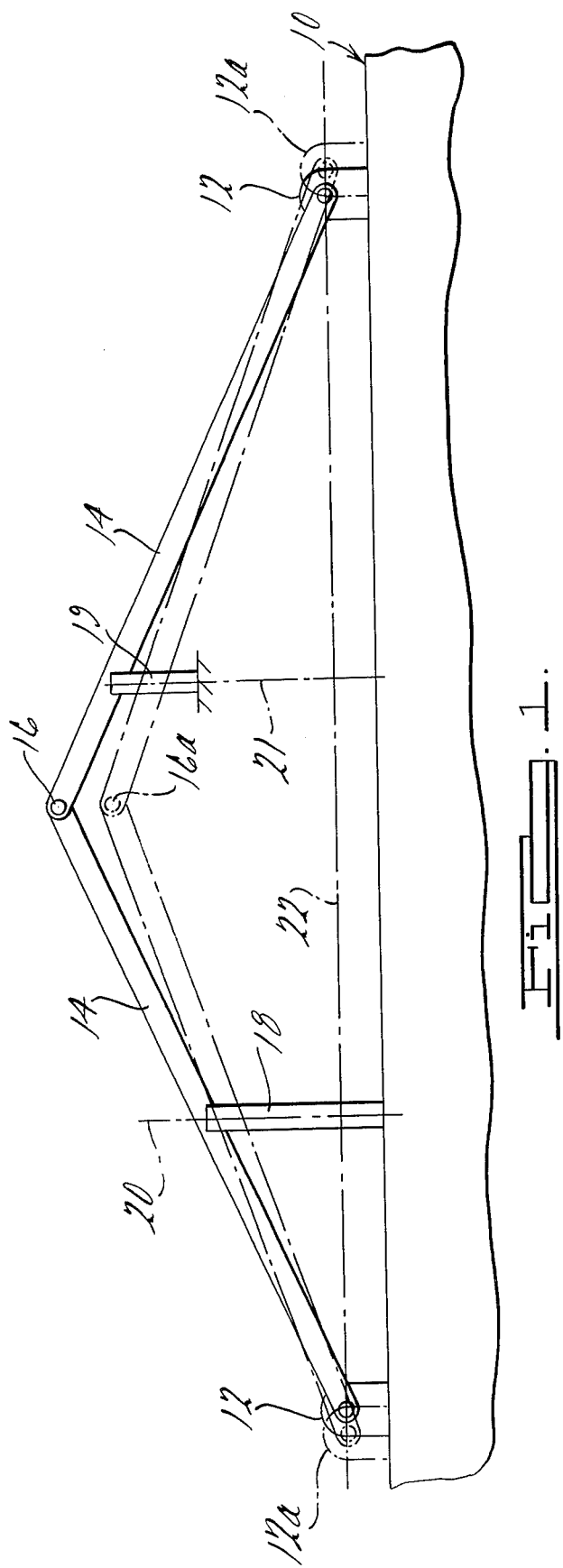
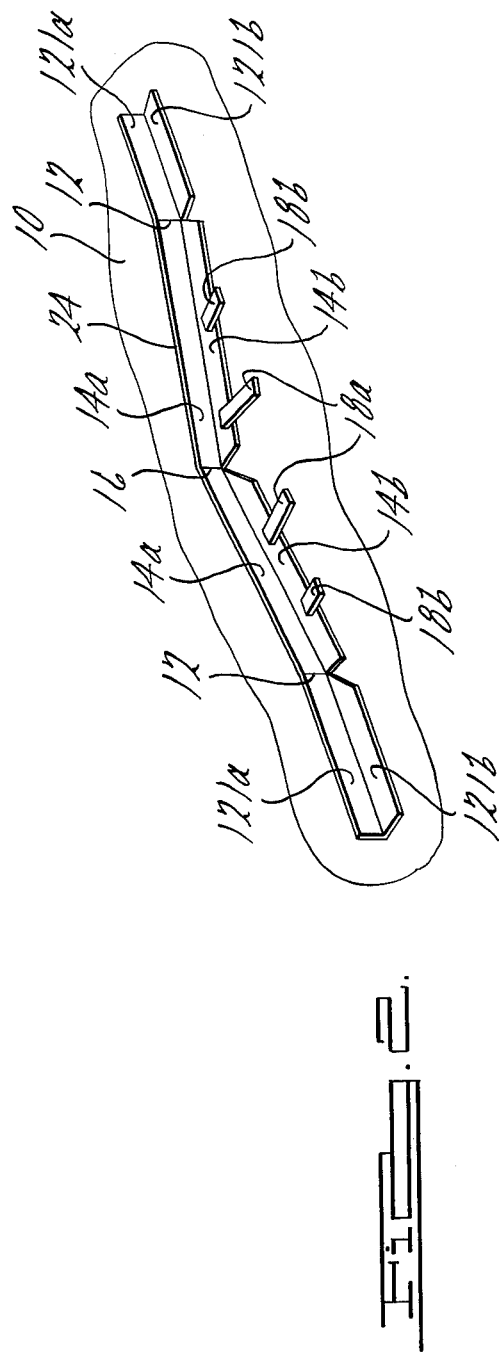

DOUBLE LEVER STRAIN MULTIPLIER APPARATUS AND METHOD

BACKGROUND OF THE INVENTION

1. Field of the Invention

The present invention is directed to the field strain measuring devices and more particularly to that portion of the above noted field which is concerned with the arrangement of such devices on a structural member to respond electrically to strains occurring within the structural member caused by loading of the structural member. More particularly, the present invention is related to that portion of the above noted field which is directed to development of information from which the fatigue life of a structural member placed in tension or compression may be predicted. More particularly still, the present invention is concerned with that portion of the above noted field which is concerned with the determination of structural loading information from structural members which may undergo strains caused by tension or compression of the structural member as well as the transmission of torque through the structural member.

2. Description of the Prior Art

The presently used method of electrically measuring strains within a structural member involves the placement of electrical resistances along the structural member in such a fashion that the occurrence of a strain will cause deformation of the electrical resistances of a nature sufficient to change the electrical resistance properties of these devices. In some instances, the distance measurements are continuously made and changes in resistance are monitored to develop desired strain information, for example structural load measurements. In another example, a strain gauge such as shown and described in U.S. Pat. No. 3,272,003 and having a known or measured resistance value is properly positioned upon a structural member and after a period of time during which the structural member is normally used, the resistance measuring device is removed and its change in resistance is measured. This type of device demonstrates a nonreversible change of resistance in the presence of a sufficiently large strain so that continuous monitoring may be avoided.

In the case of either type of strain measurement, the resulting measurement is indicative of deformation of the structural member and is expressed in inches of deformation per inch of length. It is thus mandatory that the strain measuring device be fixedly attached to the structural member at its ends so that the relationship of the strain measuring device to the structural member will not change during the time period of a strain measurement.

A method has recently been developed for determining the accumulated structural loading of a structural component in service from which the fatigue life of components in compression and tension may be predicted. The method utilizes a plurality, typically three, of strain gauges of the type illustrated in U.S. Pat. No. 3,272,003. These strain gauges have an electrical resistance which varies nonreversibly in the event of application of a sufficiently great dimensional change which may be occasioned by subjecting the structural member to which the gauge is attached to a sufficiently great strain (either tension or compression). According to the newly developed method, each strain gauge is exposed to a different multiple of the strain actually experienced by the structural member or component and, by a calculation process, the accumulated structural loading of the component may be calculated and the fatigue life may be predicted. This method is described in the Society of Automotive Engineers paper No. 730139, "Determination of Accumulated Structural Loads For S/N Gage Resistance Measurements" by Narendra J. Sheth et al. of which I was co-author.

The successful operation of this method requires the use of the particular type of strain gauge noted above which has the ability to "remember" the past history of strains applied thereto. In performing the method of the above noted SAE paper, a relatively fragile device having two rigid members arranged for attachment to the structural member or component are connected by three strain gauges extending across different length gaps. This composite is bonded into a relatively unitary body by an envelope of, for example plastic material and is attached to the component to be tested by the rigid member at points a known distance apart. The multiplication factors for the strain gauges in this apparatus are determined by dividing the known distance by the strain gauge gaps. While multiplication factors as high as 20 can readily be obtained, the practical maximum value of multiplication cannot be made much higher than about 25 since the overall apparatus becomes too large to be practical or convenient. It is therefore one object of the present invention to provide a strain multiplying apparatus and method capable of achieving higher strain multiplication values than were obtainable by the prior art multiplication apparatus. It is also an object of the present invention to provide such apparatus which may provide several different multiplication factors and thus be useful in performing the method of the above-noted SAE paper.

The strain multiplying apparatus fabricated as briefly described hereinabove is also limited to use where the structural component is subjected to strains solely of the tension/compression variety. The occurrence of an application of torsion to the component results in a twisting or flexing of the strain gauge member and multiplier to the extent that various structural damage can occur to the strain gauges. It is therefore an object of the present invention to provide for structure which may be used to multiply the strains applied to a structural component for use in performing the method of the above noted SAE paper while providing protection for the individual strain gauge members from damage induced by torsion of the structural component.

The difficulty of obtaining reliable strain information from a structural component which may also be subjected to torsional strain also exists with respect to strain measurement taken by more classical techniques, that is measurements which are taken by electrical resistances which undergo reversible changes in the presence of a strain. It is therefore a more general object of the present invention to provide a structure which may be used to advantage in obtaining the strain information from a component which may be subjected to torsional strain as well as tension and compression strains.

SUMMARY OF THE PRESENT INVENTION

The present invention contemplates the use of a pair of pivotally connected lever arm members whose free ends are pivotally connected to the structural component. One or more strain gauge members may then interconnect the structural component with either one of the lever arms. The points of connection of the strain gauge members and of the lever arms to the structural component may be arranged to lie in a line which is parallel to the axis of any potential torque transmission. The triangle formed by the structural member and the pair of pivotally interconnected lever arm members may be arranged to extend either away from the structural member or in a tangential direction to the structural member depending on location and convenience. The strain gauge member or members should be arranged so that the strain axis of the gauge member is generally perpendicular to either the associated lever arm member or the imaginary line drawn between the structural member/pivot arm pivot interconnections. The multiplication factor obtainable by this apparatus for any strain gauge placement is determined by dividing the square of the distance from the right angle intersection between the strain gauge axis and either the imaginary line or the associated lever arm to the associated lever arm structural member pivot by the length of the strain gauge axis between the imaginary line and the associated lever arm and by the length of the strain gauge gap.

BRIEF DESCRIPTION OF THE DRAWING

FIG. 1 is a diagrammatic view of the present invention illustrating its operation in cooperation with a structural component subjected to stress.

FIG. 2 is a perspective view of one embodiment of the present invention in association with a structural component subjected to stress.

DETAILED DESCRIPTION OF THE PREFERRED EMBODIMENT

Referring now to FIG. 1, a structural component 10 which may be subjected to stress is illustrated. A pair of hinge means in the form of pivot plates 12 are shown, in solid line, attached to the member 10. A pair of lever arm members 14 are connected at one end to one of the hinge plates 12 and are pivotally connected to each other by pivot pin 16. A pair of strain gauge members 18, 19 are shown interconnecting each lever arm member 14 with the structural component 10. Strain gauge member 18 is provided with a strain axis denoted by the broken line 20 and strain gauge member 19 is provided with a strain axis 21. Dimensional changes in the lengths of the strain gauge members 18, 19 in the direction of the strain axes 20, 21 will produce resistance changes which are proportional to the amount of the dimensional change. The strain gauge members 18, 19 are illustrated as having their strain axes 20, 21 arranged at substantially right angles with respect to the line 22 drawn between the pivotal connections between the lever arm members 14 and the pivot plates 12. Strain gauge member 18 has a length such that its strain gauge gap exceeds the distance from its associated lever arm 14 to the line 22 along line 20 while strain gauge member 19 has a smaller length such that its strain gap is less than the distance from its associated lever arm 14 to line 22 along line 21.

In the event that structural component 10 is subjected to a stress which will cause a lengthening of the structural component along the line 22, the pivot plates 12 will be moved apart by a small increment. For purposes of illustration, pivot plates 12a are shown in broken lines and are moved relative to the hinge plates 12 by an increment which may be denoted as $\Delta x$. This results in pivot pin 16 moving from its original position to a subsequent position denoted as 16a which is more closely spaced to the line 22 than the original pivot pin location 16. It will be appreciated that this resulting motion of the lever arm members 14 will result in a compressive force being applied to each strain gauge member 18, 19. Since the lever arm members 14 will be selected to be relatively inelastic with respect to the strain gauge members 18, 19 the compressive force applied to the strain gauge members by lever arm members 14 will result in a shortening of the strain gauge members 18, 19 along their strain axes 20, 21. The amounts by which the strain gauge members 18, 19 are shortened are proportional to the amount by which the structural component 10 has been lengthened and are hence proportional to the amount of strain to which the structural component 10 has been or is subjected.

Each strain gauge member 18, 19 can be readily selected so that measured strain, Sg, is proportional to the change in electrical resistance, $\Delta\Omega$. The electrical resistance change, $\Delta\Omega$, can be controlled to be proportional to the dimension change, $\Delta l$, in the direction of the strain axis 20, 21 according to the equation $$S_g = K \Delta\Omega = \frac{\Delta l}{l} \quad (1)$$

where $k$ is a proportionality constant expressed in units of inches per ohm inch. If the length of lever arm 14 from its pivot connection 12 to the strain gauge 18, 19 is given as A and the length of the strain axis 20, 21 from the lever arm 14 to the line 22 is given as H and the length of line 22 from the pivot 12 to the strain axis 20, 21 is L, then by the Pythagorean relation $$A^2 = H^2 + L^2 \quad (2).$$

and $$A^2 = (H + \Delta H)^2 + (L + \Delta L)^2 \quad (3).$$

Equations (2) and (3) combine and reduce to $$0 = 2L\Delta L + 2H\Delta H\ 30\ \Delta L^2 + \Delta H^2 \quad (4).$$

For small values of $\Delta L$ and $\Delta H$, $\Delta L^2$ and $\Delta H^2$ both approach zero and equation (4) may be expressed as $$2L\ \Delta L + 2H\Delta H = 0 \quad (5)$$

Thus, for equation (5) to be balanced, compression of the component 10 will result in tension in the strain gauge 18, 19 and tension in the component 10 will result in compression of the strain gauge 18, 19. Thus $$L\Delta L + H\Delta H = 0 \quad (6).$$

For strain gauge 18, $l$ and $\Delta l$ can be arranged to be equal to $H$ and $\Delta H$ respectively and, assuming such to be the case, substitution of equation (6) into equation (1) yields $$S_g = \frac{L}{H^2} \Delta L \quad (7)$$

The equation for the strain in the component, Sc, may be given by $$S_c = \frac{\Delta L}{L} \quad (8)$$

Substituting equation (8) into equation (7) yields $$S_g = \frac{L^2}{H^2} S_c \quad (9)$$

such that the multiplying factor relating the strain in the gauge to the strain in the component equals the square of the ratio of the length of the strain gauge axis to the distance from the strain gauge axis to the pivot 12 of the associated lever arm 14.

For strain gauge 19, the expressions of $l$ and $H$ are not equal while $\Delta l$ and $\Delta H$ are constrained to be equal. Thus, equation (7) is expressed as $$S_g = \frac{L}{Hl} \Delta L \quad (10)$$

for strain gauge members whose strain gap, $l$ is not equal to the distance from line 22 to the associated lever arm member 14 and equation (9) becomes $$S_g = \frac{L^2}{Hl} S_c \quad (11).$$

It is known that the strain measured by a strain gauge having a strain gap g when suitably connected across a structural component having a gap G will be a multiple of the strain in the component by a factor of (G/g). Considering strain gauge 19 and equation (9), the multiplication of measured strain compared with strain gauge 18 would amount to $$S_g = \frac{L^2}{H^2} S_c \frac{H}{l} \quad (12)$$

which is equal to $$S_g = \frac{L^2}{Hl} S_c \quad (13)$$

thereby verifying equation (11).

It can thus be seen that the general expression for strain multiplication obtained in accordance with the teachings of the present invention is the square of the distance from the strain axis to the associated lever arm pivot divided by the length of the strain gauge gap and by the length of the strain axis between the associated lever arm and the pivot connection line.

In those instances where the strain axis is arranged to be perpendicular to one of the lever arm members 14, equation (2) is expressed as $$L^2 = A^2 + H^2 \quad (14)$$

and equation (6) becomes $$L\Delta L - H\Delta H = 0 \quad (15).$$

Equation (15) tells us that compression or tension induced strain in the component will produce a like strain in the gauge but that the magnitude of the multiplication factor will not otherwise be altered.

It will be appreciated that a plurality of strain gauge members selected to have lengths which will permit their placement at different locations along the lever arm members 14, will result in different multiples of the strain actually experienced by the structural component 10 so that the method of calculating accumulated structural loads taught by the above noted SAE paper number 730139 may be implemented to predict the fatigue life of the component. Furthermore, by situating the strain gauge members so that one end of each strain gauge member lies on the line 22 drawn between the pivotal points by which the lever arm members 14 interconnect with the structural component 10, any torsional strain to which the structural component 10 may be subjected will not result in damaging twist being applied to the strain gauge member. Any such torsion will, to the extent it changes the dimensional length between the pivotal connections between the lever arm members 14 and the structural component 10, produce a dimensional change in the strain gauge member along its strain axis which may be accurately measured by the strain gauge member. In the above analysis, the hinge plate members 12 have been considered to be parts of the component 10 so that the operative length of the strain gauge member 18 has been considered to be that length from line 22 to the lever arm member 14. This can be achieved by suitably tailoring the length of the strain gauge member 18, by interposing a connection block substantially the same height as the hinge plate members 12 or by assuring that the strain gauge member 18 and the pivot points between the lever arm members 14 and component 10 are cooperative to define a single line.

Referring now to FIG. 2, one embodiment of the present invention is illustrated in association with a structural component 10 which, for convenience is illustrated in a fragmentary view. According to this embodiment, the strain multiplier 24 according to the present invention is comprised of four pivotally interconnected sections. Two of the sections comprise the lever arm members 14 while the other two of the sections comprise the attachment means for connecting the lever arm members 14 to the structural component 10. These attaching means are denoted here for convenience as 121. Each of the four sections is comprised of an upstanding portion or member which is denoted by the suffix letter a and a portion lying at an angle thereto denoted by the suffix letter b. The two portions denoted as 121b are fixedly attached to the structural component 10 by any suitable means such as glueing, brazing, soldering, welding, bolting, etc. The connection between the adjacent upstanding portions 121a, 14a comprises a pivot connection and is here denoted by the numeral 12. The interconnection between the adjacent upstanding portions 14a, 14a also comprises a pivotal connection and is here denoted by the numeral 16. A plurality of strain gauge members 18 is shown interconnecting the portions 14b with the structural component 10. The plurality of strain gauge members denoted generally as 18 is comprised of a first pair of strain gauge members denoted as 18a arranged to have their strain axes perpendicular to the line drawn between the pivot axes denoted as 12.

The calculation of the multiplying factors for the strain multiplying apparatus 24 would appear, at first blush, to be complicated by the attachment of the strain gauge members 18 to the flange portions 14b instead of the upstanding portions 14a and by the extension of the strain gauge members 18 across the pivot center line of the multiplying apparatus 24. These differences do not however complicate the calculation since their effect is comparable to a mere translation of the strain gauge members along their strain axes and calculation using the general equation 11 or the special case equation 9 will yield the correct figure.

It can be seen that the present invention readily accomplishes its stated objections. The strain multiplying apparatus is capable of achieving high multiples of strain since the multiplication equation contains a squared term in its numerator. Furthermore, the apparatus may be made relatively insensitive to torsion by mounting the strain gauge members along the pivot center line. The apparatus also provides for a relative infinite variation in multiplying factor along with the convenient capability of having a large number of strain gauge members coupled to the same multiplying apparatus.

I claim:

1. Apparatus for multiplying the strain produced in a structural component comprising:
   a pair of pivotally interconnected lever arm members including means for pivotally attaching the free ends of said lever arm members to a structural component; and
   at least one strain gauge means having one end attached to at least one of said pair of lever arm members and attachable at an opposite end to the structural component so that an imaginary line drawn between the structural component attachment ends of the pair of lever arm members will pass through the end of the strain gauge means which is attachable to the structural component.

2. The apparatus of claim 1 wherein the strain gauge means is positioned and dimensioned so that the strain axis thereof will be perpendicular to the structural component when the strain gauge means and the pair of lever arm means are attached to the structural component.

3. The apparatus of claim 1 including a plurality of strain gauge members attached to the pair of lever arm members at various distances from the pivotal interconnection of the lever arm members.

4. The apparatus of claim 3 wherein each of the plurality of strain gauge members is positioned and dimensioned so that the strain axis thereof will be perpendicular to the structural component when the strain gauge members and the pair of lever arm members are attached to the structural component.

5. The method of multiplicatively applying the strain produced in a structural component to a strain gauge means comprising the steps of:
   pivotally attaching a pair of substantially rigid, pivotally interconnected, lever arm members to a structural component to be strained, the points of attachment between the lever arm members and the structural component being less distant than the total length of the lever arm members;
   interconnecting at least one of the lever arm members and the structural component with a strain gauge means having a strain length, $l$, and a strain axis having a length $H$ from the associated lever arm to the points of attachment line and arranged to be perpendicular to one of the structural component and the associated lever arm member, at a distance, $L$, from the pivotal interconnection between the lever arm member and the structural component measured along the one of the structural component and the lever arm to which the strain gauge axis is perpendicular;
   electrically measuring the dimensional change in the strain gauge means produced by the strain induced dimensional change in the structural component between the points of attachment of the lever arm members to the structural component; and
   dividing the measured value by the ratio of the square of the length, $L$, to the strain length, $l$, multiplied by the length $H$.

6. The method of claim 5 including the steps of interconnecting the lever arm members and the structural component with a plurality of strain gauge members, each of said plurality of strain gauge members being arranged to be perpendicular to one of the structural component and the associated lever arm member.

7. Apparatus for multiplying the strain produced in a structural component comprising:
   a pair of pivotally interconnected lever arm members including means for pivotally attaching remote ends of said lever arm members to a structural component; and
   at least one strain gauge means having a strain axis connected to one member of said pair of lever arm members and attachable to the structural component so that said strain axis is perpendicular to one of a) said one member of said pair of lever arm members and b) an imaginary line interconnecting the remote ends of the pair of lever arm members when attached to the structural component.

* * * * *